Patented Jan. 2, 1951

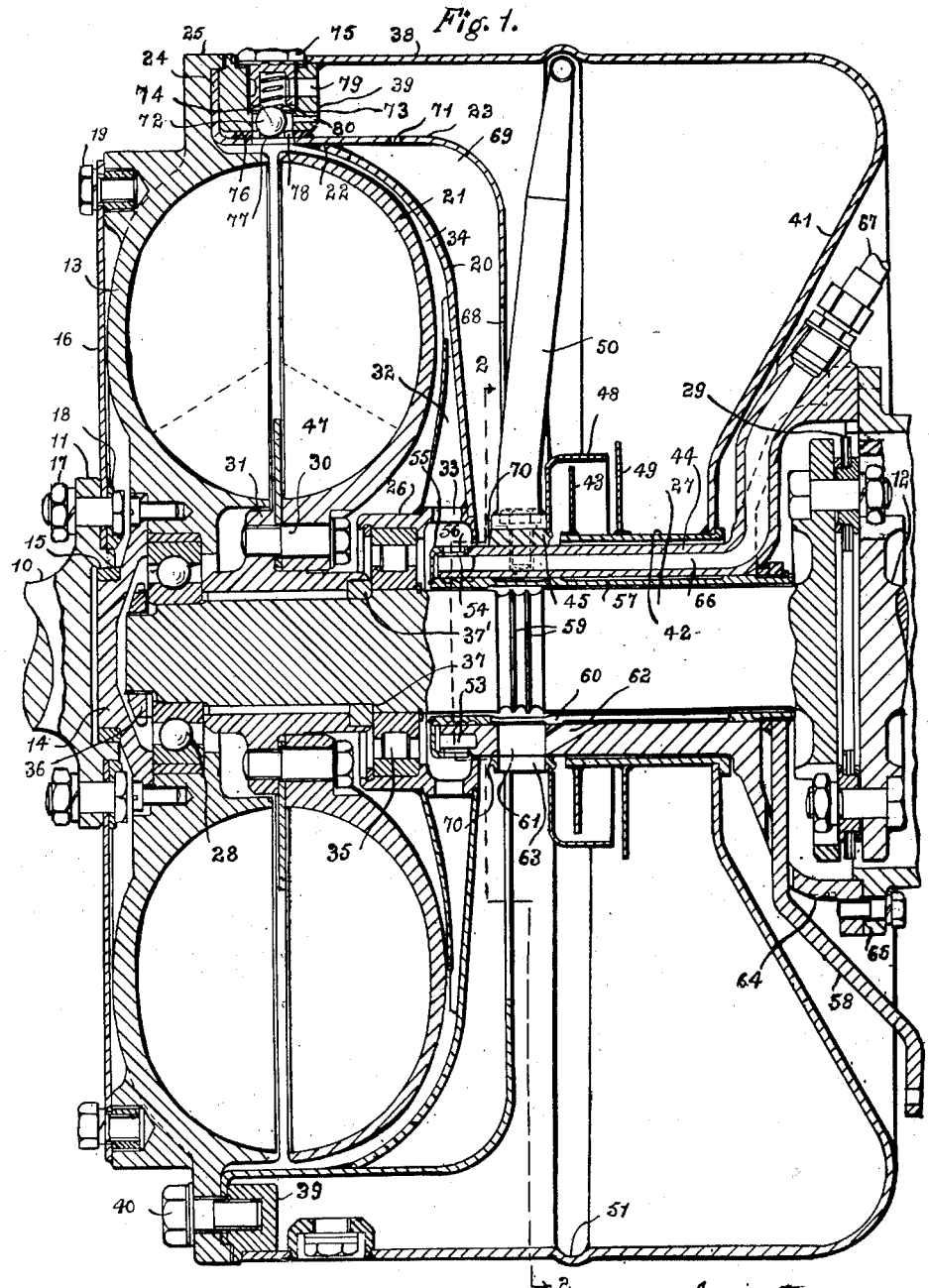

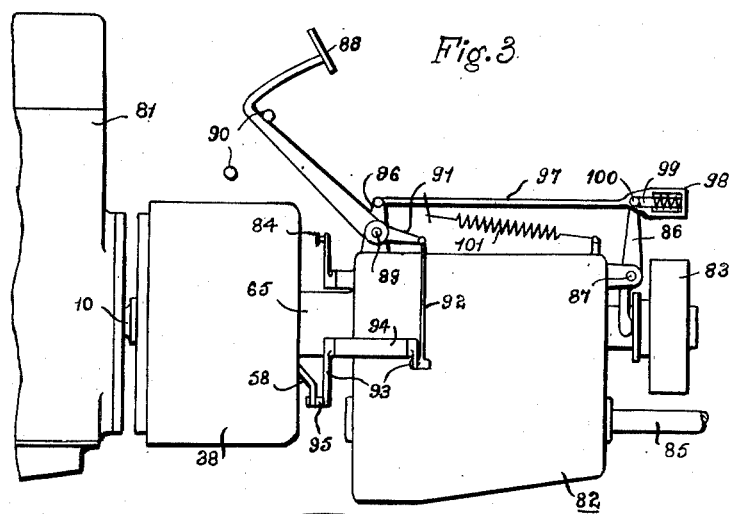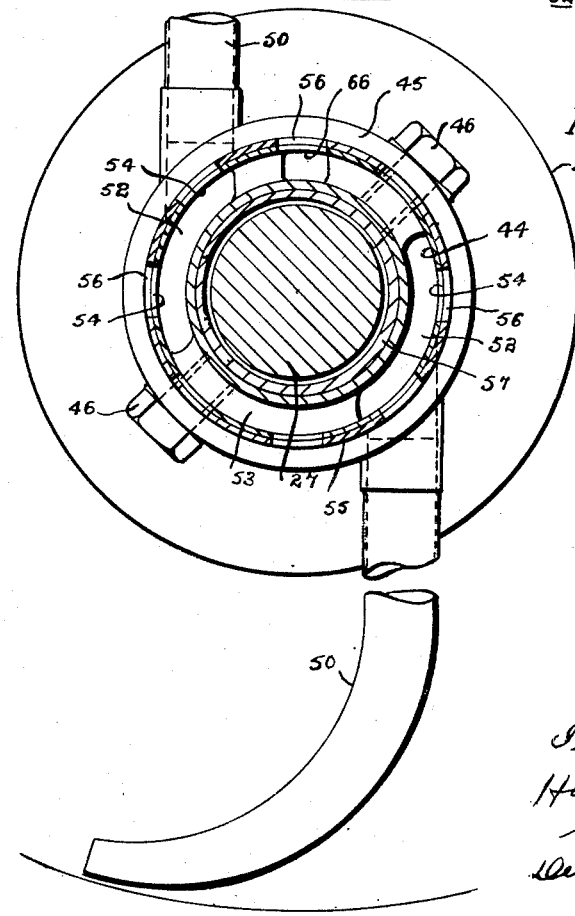

2,536,473

UNITED STATES PATENT OFFICE 2,536,473

DISENGAGEABLE COUPLING FOR CONVEYING ROTARY MOTION

Harold Sinclair, London, England

Application November 30, 1944, Serial No. 565,953
In Great Britain November 23, 1943

11 Claims. (Cl. 74—732)

This invention relates to disengageable power-transmission couplings for conveying rotary motion and employing a working liquid. The improved coupling may be of the type in which centrifugally-generated fluid pressure is employed to urge friction elements into engagement with each other, but it is preferably of the turbo type, having vaned impeller and runner elements co-operating to form a circuit for the working liquid. The invention relates to such couplings of the kind having, in addition to the working chamber which includes the turbo circuit or to any other working chamber, a rotary reservoir chamber, means for exhausting liquid from the working chamber to the reservoir chamber, and a fixed or movable scoop in the reservoir chamber adapted to transfer liquid from the reservoir chamber to the working chamber.

A coupling of the kind referred to must be charged with sufficient working liquid to enable the working chamber to be filled to a predetermined extent when the coupling is cold. As the temperature of the liquid rises with operation of the coupling, the liquid expands and its volume becomes greater than that initially required for the filling of the working chamber. The excess liquid, due to such expansion or to slight over-filling, in such couplings of known type collects in the reservoir chamber and causes the scoop to build up an unnecessarily high pressure in the filling system of the working chamber, with consequent risk of leakage of the liquid from the coupling, for example past a shaft labyrinth gland; also there is undesirable disturbance of the liquid in the reservoir chamber arising from the scoop's ploughing in the ring of excess liquid and from the needless recirculation of the excess liquid through the scoop.

According to one feature of the present invention, these difficulties are overcome by providing within the rotary parts of the coupling, e. g. within the reservoir chamber, a supplementary reservoir adapted to collect liquid in excess of the quantity required by the working chamber and to release such excess liquid relatively slowly. The supplementary reservoir may be annular and carried by the driving part of the coupling.

Couplings of the kind hereinbefore referred to may be provided with a stationary housing surrounding one of the coupling shafts and penetrating an aperture in an end wall of the reservoir chamber to support the scoop tube. In order to prevent leakage of liquid, it is desirable that the liquid level should be below the said aperture when the coupling is at rest, and this is essential when the aperture is sealed with respect to the housing by a labyrinth gland, as is usual. Consequently the over-all dimensions of the reservoir chamber, in the case of a coupling intended to be used with its axis horizontal, can be appreciably reduced by reducing the diameter of the said aperture and thereby increasing the effective capacity of the reservoir chamber when at rest. It is sometimes desired to provide a controllable valve on the duct leading from a fixed scoop to the working chamber, the actuating member of this valve being carried by the said housing, and with such a construction the presence of the valve-actuating member necessitates an increased diameter of the said aperture in the end wall of the reservoir chamber. A further object of this invention is to meet these conflicting requirements of a compact construction and an external valve control member, and this object is attained, according to a further feature of the invention, by employing a valve having an actuating member in the form of a tube mounted coaxially with respect to the housing. The actuating tube may be rotatably fitted within the housing and connected to a ported ring fitted on and co-operating with one or more ports in the end portion of the housing. Where the coupling is of the preferred turbo type, the back of the coupling runner may be covered by a dished shell fixed to the impeller, the housing penetrating a central aperture in this shell, and the control valve being disposed on the part of the housing inside the shell. In this case the auxiliary reservoir may be formed between the shell and an auxiliary shell fixed to the first-mentioned shell on the side thereof remote from the runner.

If a valve of the sleeve type is used, the scoop may be a non-adjustable tube and this fixed scoop and valve may be arranged to occupy a length which is small in relation to the dimensions of the reservoir chamber. This enables the gland between the housing and the reservoir-chamber shell to be placed close behind the working circuit, which is specially favourable in a coupling used in a vehicle that is required at times to stop on a steep gradient without losing oil through the gland of the stationary coupling.

The end wall of the reservoir chamber of the improved turbo coupling may be of re-entrant form and at least partly accommodate a bell housing on the outer end of the said housing, the bell housing in turn at least partly accommodating a mechanical coupling connected to the shaft that is accommodated in the housing.

An embodiment of the invention, as applied to a coupling suitable for use on a vehicle transmission, will be described by way of example with reference to the accompanying drawings, in which:

Fig. 1 is a sectional side elevation of a preferred arrangement,

Fig. 2 is a section on the line 2—2 in Fig. 1, and

Fig. 3 is a diagram of a power-transmission system embodying the coupling shown in Figs. 1 and 2.

Referring to Fig. 1, a driving shaft 10, which may be the crank-shaft of an internal-combustion engine, has a flange 11. The impeller 13 of the hydraulic coupling has a short central spigot 14 which bears in a cylindrical socket 15 in the end of the shaft 10, and a flexible annular metal diaphragm 16 has its inner border clamped to the flange by bolts 17 and an angle-section ring 18 and its outer border fixed by screws 19 to the impeller 13. The spigot and diaphragm connection between the impeller and the crank shaft form a universal coupling for accommodating transverse vibrations of the crank shaft. A dished shell, formed by a steel pressing 20, shrouds the back of the runner 21, and it is welded at its periphery 22 to a sheet steel auxiliary reservoir shell 23 having at its front end a radial flange 24 abutting a flange 25 on the impeller. The shell structure 20, the part of the shell 23 in front of its junction with the shell 20, and the impeller together form a working chamber. The impeller 13 and the runner 21 co-operate to form a toroidal working circuit 9 contained within the working chamber. The working chamber shell 20 has a central tubular boss 26 leading forwards. A runner shaft 27 has its front end supported by a deep-groove ball bearing 28, housed in the impeller hub, and the rear end of the runner shaft is connected to a rigidly-journalled driven shaft 12, e. g. the input shaft of a change-speed gear, by a mechanical coupling 29 of known type permitting angular deviation of the shaft axes. The runner 21 and an annular baffle 47 are fixed by screws 30 to a hub 31 splined to the runner shaft 27. The part of the working chamber constituted by the space 34 between the back of the runner 21 and the shell 20 forms an inlet path for liquid entering the turbo circuit, and shrouded radial vanes 32 are attached to the front of the shell 20 to assist in filling. Inlet ports 33 distributed around the tubular boss 26 open into the radially inner part of the spaces between the vanes 32. A journal bearing 35 of the roller type is fitted between the front end of the boss 26 and the runner shaft 27. A nut 36 on the front end of the shaft 27 clamps the inner race of the bearing 28 together with the hub 31 and a washer 37' against a shoulder 37 on the runner shaft.

A sheet steel reservoir casing 38 has a cylindrical portion the diameter of which equals that of the outer edge of the impeller flange 25. A ring 39 is welded within the front end of this casing and abuts the rear face of the flange 24 of the working-chamber shell, being held fast to the impeller by screws 40. The rear of the reservoir casing is constituted by an end wall 41 having a central aperture. A gland tube 42 projects forwards from the edge of this aperture, and to the front end of this tube is welded an annular gland disk 43 extending radially outwards. A stationary housing 44 passes with a small clearance through the gland tube 42 and around the runner shaft 27, its front end extending within the tubular boss 26 of the working-chamber shell 20. A ring 45 fitting closely on the housing 44 is locked to it by radial screws 46 (Fig. 2), and a gland drum 48 is fixed to this ring immediately in front of the gland tube 42 and has a cylindrical flange extending rearwards around the gland disk 43. A second gland disk 49 is welded to the tube 42, masking the drum 48. Two diametrically opposed similar scoop tubes 50 are fixed to the ring 45 with their mouths in a circumferential channel 51 formed in the reservoir casing 38. These scoop tubes communicate by ducts 52 with an annular duct 53 in the front face of the housing 44, and a number of uniformly spaced valve ports 54 lead from the radially outer side of this channel to the outside of the front end of the housing 44 within the tubular boss 26 of the working-chamber shell. A valve sleeve ring 55 having corresponding ports 56 is rotatably mounted in the front end of the housing 44 and is provided with a flange turned radially inwards and welded to the front end of a tubular actuating member 57 rotatably fitted in the housing and having a small clearance from the runner shaft 27. A control lever 58 is fixed to the rear end of the actuating tube 57 and can rotate the valve sleeve ring at least between the position shown in the drawings, in which the two series of ports 54 and 56 are in register with each other and a position in which these ports are fully masked.

In order to prevent leakage of working liquid between the runner shaft 27 and the housing 44, this shaft is provided with thrower rings 59, the valve actuating tube 57 has a drain port 60, and the housing 44 has drain ports 61 and 62 leading to a drain port 63 in the ring 45.

The rear end of the stationary housing is formed as a bell housing 64 accommodating the flexible coupling 29 and secured to the casing 65 of the driven machine (e. g. the gear box), and the rear end wall 41 of the reservoir casing is forwardly dished so that the bell housing 64 is accommodated in the re-entrant part of the reservoir casing, the over-all length of the transmission system being thereby reduced.

The duct 66 formed in the housing 44 and bell housing 64 leads from the channel 53 to a pipe union 67 which is connected to accessibly placed means not shown for charging the coupling with working liquid. The auxiliary reservoir shell 23 is of dished form and has a relatively large central aperture 68. It forms with the working-chamber shell 20 an auxiliary reservoir space 69 shaped as an annular channel having its mouth opening radially inwards. The shell 20, being welded at its periphery to the shell 23, forms a fluid-tight division between the auxiliary reservoir space 69 and the working chamber 9, 34. The mouth of the auxiliary reservoir 69 is thus so placed as to receive liquid that escapes from the working chamber of the coupling through the clearance between the boss 26 of the working-chamber shell and the stationary housing 44, and an annular deflector 70 is formed on the front face of the ring 45 so as to direct the escaping liquid into the mouth of the auxiliary reservoir channel. A few discharge ports such as 71 of relatively small capacity are formed in the outer part of the auxiliary shell 23, whereby the auxiliary reservoir can discharge slowly to the main reservoir.

The ring 39 forming the front flange of the main reservoir casing is provided with two or more uniformly spaced centrifugal valves of known type and of relatively large capacity, which are arranged to put the turbo circuit into communication with the main reservoir when the speed of rotation of the impeller falls to a predetermined value. The valve shown in Fig. 1 is of the ball type, the ball 72 being urged by a helical spring 73 radially inwards off its seating 74 in a screw plug 75. A washer 76, welded over a port 77 in the working chamber shell, has inwardly directed tongues 78 which limit displacement of the ball away from its seating. The valve outlet port is denoted by 79, and a leak-off nozzle 80 of small capacity is provided in parallel with the ball valve so as to ensure a sufficient discharge of heated liquid from the working chamber during normal operation, when the ball valve is closed.

When the impeller 13 is rotating fast and the sleeve valve 55 is open, the scoops 50 transfer liquid from the main reservoir chamber to the working chamber, and, if the latter becomes full, e. g. due to expansion of the liquid, while there is still a substantial quantity of liquid in the main reservoir chamber, the excess liquid delivered by the scoops escapes through the clearance between the tubular boss 26 of the working-chamber shell and the stationary housing 44 and is trapped in the auxiliary reservoir channel 69. The small circulation through the main reservoir and the scoops due to the flow of hot liquid from the said leak-off nozzles 80 and to discharge from the ports 71 in the auxiliary reservoir is unobjectionable. When the impeller speed falls and the centrifugal valves open, the turbo circuit empties rapidly to the main reservoir chamber, and, if at the same time the sleeve valve 55 is closed, the turbo circuit remains substantially empty and drag torque is practically eliminated.

The valve-actuating member may be a separate control member or it may be coupled to a vehicle control member. A convenient arrangement of the improved coupling shown in Figs. 1 and 2 as applied to the transmission system of a vehicle is shown in Fig. 3. The engine is denoted by 81 and 82 denotes generally a mechanical change-speed gear of the "traction" type, i. e. one in accordance with my Patent No. 2,011,734 and having gear-selecting clutches adapted to be biased towards engagement by a preselector 84 and to engage automatically when synchronism is established between their driving and driven elements, the gear also having an auxiliary slippable coupling, e. g. in the form of a friction clutch 83, adapted to couple its input shaft, which is directly connected to the runner of the hydraulic coupling (identifiable by the reservoir shell 38), to an output shaft 85 in a ratio giving a speed not lower than that yielded by the highest speed ratio of the gear, whereby, during changes from any lower to any higher speed ratio, the speed ratio of the runner of the hydraulic coupling and of the shaft 85 can be forcibly brought to that of the gear required to be engaged without interrupting the transmission of driving torque. The gear-selecting clutches are preferably of the synchro-self-shifting type as described in my patent specification No. 2,245,017. The clutch 83 can be engaged by counter-clockwise movement of a yoke lever 86 pivoted to the gear box at 87. A control pedal 88, pivoted to the gear box at 89, and having its movement limited by stops 90, is rigid with a lever 91 connected to the valve control lever 58 of the hydraulic coupling by a link 92, an offset bell-crank lever 93 pivoted at 94 to the gear box and a link 95. The arrangement is such that when the pedal is in engagement with either of the stops 90, the valve in the hydraulic coupling is open, while when the pedal is midway between the stops this valve is closed. A second lever 96 rigid with the pedal 88 is coupled by a link 97 and a spring link 98 to the clutch actuating lever 86. The spring link 98 has a slot 99 co-operating with a pin 100 on the lever 86 and of such a length as to permit the pedal to be depressed far enough to shut the valve without engaging the clutch. Further depression engages the clutch, the spring link allowing the pedal to be fully depressed. A tension spring 101 urges the pedal towards the upper stop. When it is required to interrupt the torque almost completely between the engine and the gear box, e. g. in order to allow the gear to be shifted between forward or reverse and neutral with the engine running at idling speed, the pedal 88 is half depressed so as to shut the valve. In normal gear changes while the vehicle is running the pedal is fully depressed, the momentary closing of the valve as the pedal passes through mid stroke being too short to have any appreciable effect, since the centrifugal ball valves 72 are then closed on their seatings 74.

The effective capacity of the auxiliary reservoir may be 10% to 25% of the capacity of the turbo circuit.

In the improved coupling the front end of the gland tube on the reservoir casing can be close behind the working-chamber shell, only sufficient space being left to accommodate the scoop tubes, and consequently the coupling will be free from leakage when it is at rest with its axis steeply inclined upwards towards the impeller end, as may occur in practice for example with tractor transmissions.

I claim:

1. A disengageable power-transmission coupling for conveying rotary motion and employing a working liquid, the coupling being of the kind having a rotary reservoir chamber, a rotary working chamber coaxial with said reservoir chamber and having means for discharging working liquid to said reservoir chamber, and a scoop in said reservoir chamber capable of transferring liquid from said reservoir chamber to said working chamber, characterized by a supplementary reservoir disposed within the rotary parts of the coupling which comprises at least one fluid-tight wall preventing direct communication between the radially outer part of said rotary working chamber and said supplementary reservoir, said rotary working chamber having an aperture in the neighborhood of its axis of rotation, and said supplementary reservoir having an outlet capable of releasing liquid relatively slowly to said reservoir chamber and an inlet positioned to receive surplus liquid overflowing from said aperture owing to expansion consequent on rise in temperature.

2. A disengagable power-transmission coupling for conveying rotary motion and employing a working liquid, the coupling being of the kind having a working chamber for said liquid, which chamber comprises an end wall having a central aperture, a rotary reservoir chamber having an end wall provided with a central aperture, a coupling shaft penetrating said apertures, a stationary housing surrounding said shaft and also penetrating said apertures, a scoop tube supported by said housing for collecting liquid in said reservoir chamber and communicating with a duct in said housing leading to said working chamber, a rotary valve on the inner end of said housing within said working chamber for controlling said duct, and a tube mounted co-axially with respect to said housing and rotatable to actuate said valve.

3. A disengageable power-transmission coupling for conveying rotary motion and employing a working liquid, the coupling being of the kind having a rotary reservoir chamber, a vaned impeller and a vaned runner co-operating to form a turbo working circuit coaxial with said reservoir chamber, a working chamber including said circuit and bounded in part by an annular shell which covers the back of one of said vaned elements and the periphery of which is joined to the other of said vaned elements, said working chamber having means for discharging liquid to said reservoir chamber, and a scoop in said reservoir chamber capable of transferring liquid from said reservoir chamber to said working chamber, characterized by a supplementary reservoir disposed within said reservoir chamber and having an effective capacity of between 10% and 25% of the capacity of said working circuit, said shell forming a fluid-tight barrier between the radially outer part of said rotary working chamber and said supplementary reservoir, and having a central aperture, and said supplementary reservoir having an outlet capable of releasing liquid relatively slowly to said reservoir chamber and an inlet positioned to receive surplus liquid overflowing from said aperture owing to expansion consequent on rise in temperature.

4. A coupling as defined in claim 3, and in which the supplemental reservoir is annular and is bounded in part by and rotates with said shell.

5. A disengageable power-transmission coupling for conveying rotary motion and employing a working liquid, the coupling being of the kind having a working chamber for said liquid, a rotary reservoir chamber having an end wall, a coupling shaft penetrating a central aperture in said end wall, a stationary housing surrounding said shaft and also penetrating said aperture, a scoop tube supported by said housing and communicating with a duct in said housing leading to said working chamber, a ported ring rotatably fitted on the end portion of said housing for controlling communication between said duct and said working chamber, and a tube which serves to actuate said ring and which is displaceably fitted within said housing.

6. A disengageable power-transmission coupling for conveying rotary motion and employing a working liquid, the coupling being of the kind having a vaned impeller, a vaned runner juxtaposed to said impeller, a dished shell fixed to said impeller, covering the back of said runner and forming with said impeller a working chamber for said liquid, a reservoir mounted for rotation with said impeller and disposed on the side of said shell remote from said working chamber, a stationary housing penetrating central apertures in said reservoir and in said shell, a scoop tube mounted on said housing and communicating by a duct in said housing with an outlet from said housing within said working chamber, an auxiliary shell fixed to said dished shell on the side thereof remote from said impeller and co-operating with said dished shell to form an annular supplementary reservoir opening radially inwards to collect liquid overflowing from said working chamber, said supplementary reservoir being arranged to discharge slowly to the first-mentioned reservoir.

7. A disengageable power-transmission coupling for conveying rotary motion and employing a working liquid, the coupling being of the kind having a driving shaft, a vaned impeller connected to said shaft by a universal coupling, a vaned runner juxtaposed to said impeller, a dished shell fixed to said impeller, covering the back of said runner and forming with said impeller a working chamber for said liquid, a reservoir mounted for rotation with said impeller and disposed on the side of said shell remote from said working chamber, said reservoir having an end wall of re-entrant form and provided with a central aperture, a stationary tubular housing penetrating said aperture with clearance, a fixed support for said housing, a runner shaft rigidly connected to said runner and passing through said housing with clearance, a journal bearing supporting the front end of the runner shaft in said impeller, a journal bearing supporting said shell from said runner shaft, a scoop on said housing for transferring liquid from said reservoir to said working chamber, a bell housing on the outer end of said tubular housing and at least partly accommodated in the re-entrant part of said end wall, a driven shaft, and a mechanical universal coupling between said runner shaft and said driven shaft, which is at least partly accommodated in said bell housing.

8. A disengageable power-transmission coupling for conveying rotary motion and employing a working liquid, the coupling being of the kind having a vaned impeller, a vaned runner juxtaposed to said impeller, a dished shell fixed to said impeller, covering the back of said runner and forming with said impeller a working chamber for said liquid, a reservoir mounted for rotation with said impeller and disposed on the side of said shell remote from said working chamber, a centrifugal valve controlling communication between said working chamber and said reservoir and arranged to close in response to acceleration of said impeller, a stationary housing penetrating central apertures in said reservoir and in said shell, a scoop tube mounted on said housing and communicating by a duct in said housing with an outlet from said housing within said working chamber, an auxiliary shell which is fixed to said dished shell on the side thereof remote from said impeller, which forms an annular supplementary reservoir opening radially inwards, and which is capable of draining slowly to the first-mentioned reservoir.

9. The combination of a hydraulic turbo-coupling, a mechanical change-speed gear of the preselector type in series with said coupling, and a slippable coupling in parallel with said gear, said turbo coupling including a working circuit, a rotary reservoir, pumping means for transferring liquid from said reservoir to said circuit, a control member operable for disabling said pumping means, and means for discharging liquid from said circuit to said reservoir, and said slippable coupling having a control member operable for engaging it to maintain the transmission of torque during changes from a lower- to a higher-speed ratio in said gear, and a common actuating member operatively connected with both of said control members in such a manner that continued operation of said actuating member in one sense first disables said pumping means, and thereafter re-establishes operation of said pumping means and engages said slippable coupling.

10. A disengageable power-transmission coupling for conveying rotary motion and employing a working liquid, the coupling being of the kind having rotary driving and driven parts, a rotary working chamber for said liquid, a reservoir chamber constrained to rotate with said driving part, means for exhausting liquid under centrifugal force from said working chamber to said reservoir chamber, and a scoop in said reservoir chamber capable of transferring liquid from said reservoir chamber to said working chamber, wherein there is provided an annular supplementary reservoir separate from said working chamber and co-axial and constrained to rotate with said reservoir chamber, said working chamber including an annular wall portion preventing direct communication between the peripheral part of the working chamber and said supplementary reservoir, and said supplementary reservoir having an opening placed to collect excess liquid that spills over said annular wall portion from the radially inner part of said working chamber and having a restricted discharge port positioned to release said excess liquid to said reservoir chamber.

11. A disengageable power-transmission coupling for conveying rotary motion and employing a working liquid, the coupling being of the kind having a driving part including a vaned impeller, a vaned runner cooperating with said impeller to form a turbo circuit, a working chamber including said circuit and bounded in part by a shell having a central aperture and covering the back of one of said vaned elements, a rotary reservoir chamber, means for exhausting liquid under the action of centrifugal force from said working chamber to said reservoir chamber, and a scoop in said reservoir chamber capable of transferring liquid from said reservoir chamber to said working chamber, wherein there is provided within the rotary parts of the coupling and at the side of said shell remote from the working chamber an annular supplementary reservoir which is bounded in part by, rotates with and is carried by said driving part, the effective capacity of which is between 10 and 25% of the capacity of said turbo circuit and which is placed to collect liquid discharged through said aperture from said working chamber in excess of the quantity required by said working chamber, said shell forming a fluid-tight barrier between the radially outer part of said working chamber and said supplementary reservoir which has a restricted discharge port for releasing said excess liquid relatively slowly to said reservoir chamber.

HAROLD SINCLAIR.

REFERENCES CITED

The following references are of record in the file of this patent:

UNITED STATES PATENTS

| Number | Name | Date |
|---|---|---|
| 1,873,688 | Walker | Aug. 23, 1932 |
| 1,978,172 | Sinclair | Oct. 23, 1934 |
| 2,049,673 | Starr | Aug. 4, 1936 |
| 2,084,219 | Salerni | June 15, 1937 |
| 2,102,755 | Sinclair | Dec. 21, 1937 |
| 2,161,398 | Yingling | June 6, 1939 |
| 2,187,656 | Kiep | Jan. 16, 1940 |
| 2,264,340 | Sinclair | Dec. 2, 1941 |
| 2,280,042 | Duffield | Apr. 14, 1942 |
| 2,299,049 | Ziebolz | Oct. 13, 1942 |
| 2,299,883 | Dunn | Oct. 27, 1942 |
| 2,352,483 | Jandasek | June 27, 1944 |
| 2,421,501 | Hasbrouck | June 3, 1947 |